Figure 1:
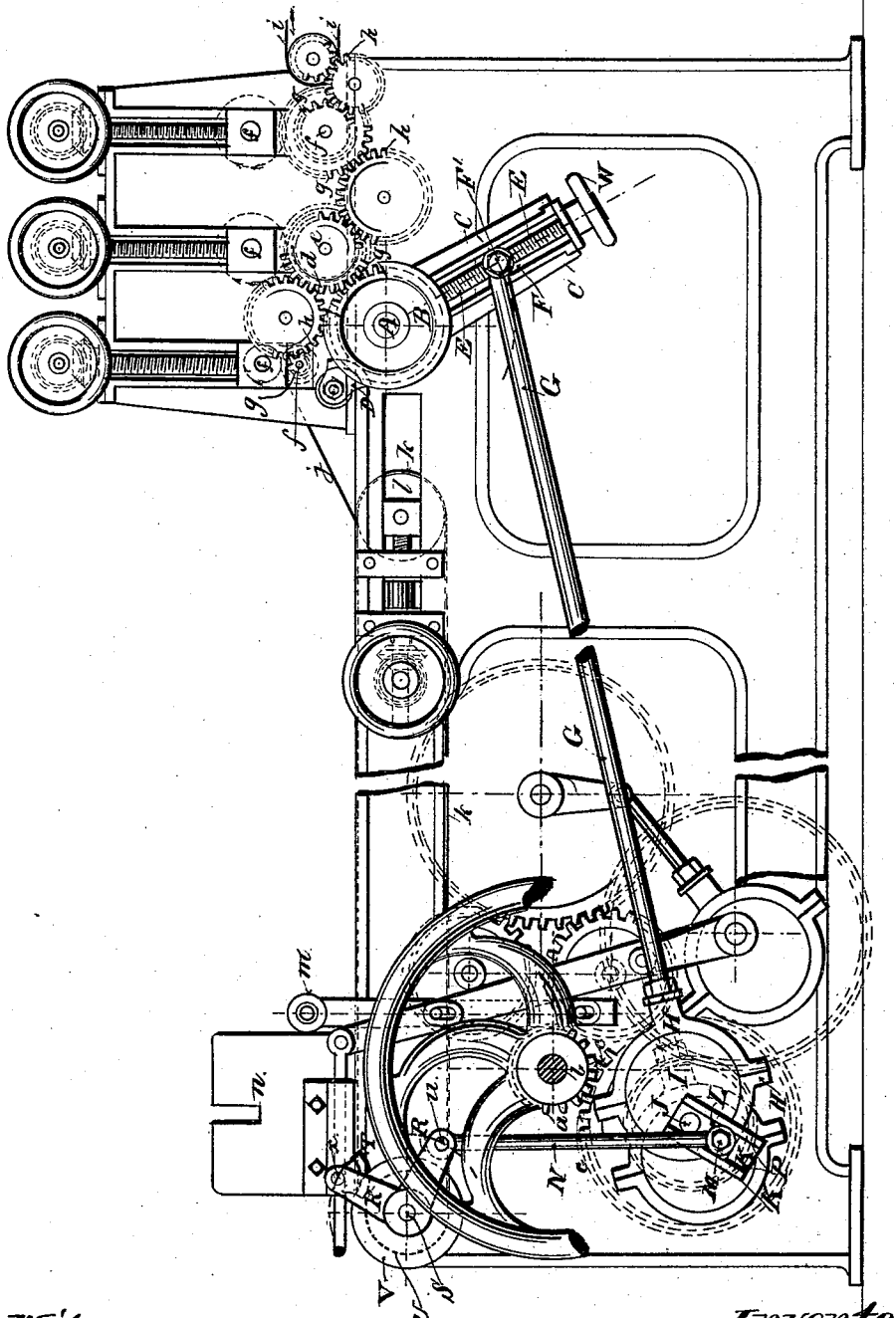

(No Model.) 2 Sheets—Sheet 1.

W. BRIERLEY.
LOZENGE MACHINE.

No. 496,590. Patented May 2, 1893.

Witnesses
J. Harry Daly.
Robert Lovett.

Inventor
William Brierley,
By James L. Norris.
Atty.

THE NORRIS PETERS CO., PHOTO-LITHO., WASHINGTON, D. C.

(No Model.) 2 Sheets—Sheet 2.
W. BRIERLEY.
LOZENGE MACHINE.
No. 496,590. Patented May 2, 1893.
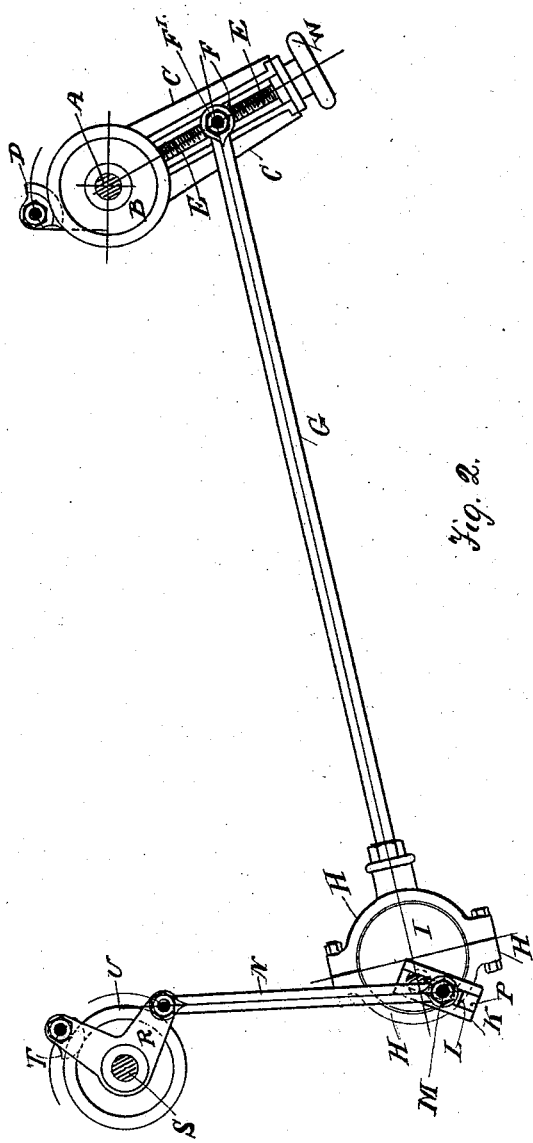
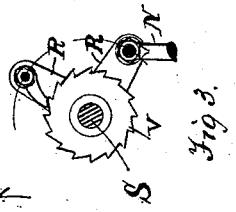
Witnesses.
J. H. Daly
Robert Everett
Inventor.
William Brierley,
By James L. Norris.
Atty.

UNITED STATES PATENT OFFICE.

WILLIAM BRIERLEY, OF ROCHDALE, ENGLAND.

LOZENGE-MACHINE.

SPECIFICATION forming part of Letters Patent No. 496,590, dated May 2, 1893.

Application filed September 1, 1890. Serial No. 363,733. (No model.)

*To all whom it may concern:*

Be it known that I, WILLIAM BRIERLEY, a subject of the Queen of Great Britain, residing at Rochdale, England, have invented certain new and useful Improvements in Lozenge-Machines, of which the following is a specification.

My invention relates to machines used for the manufacture of confections and lozenges, which machines are known as pinning, printing, embossing, and lozenge cutting machines.

The object of my invention is to provide novel mechanism by which the intermittent motions or travel of the pinning rollers may be regulated or varied without the aid of toothed gear wheels as now employed.

The machines herein referred to, and the subject of my improvements, are chiefly attended by females and when a change of motion is required the labor entailed in adjusting the wheels is often tedious and involves in many cases much loss of time, particularly so when worked by unskilled attendants, in consequence of which a system of change wheels must necessarily be provided with the machine.

It may be necessary to frequently adjust or employ wheels having a greater or less number of teeth particularly with relation to the pinning rollers, as it may occur that the paste is delivered from the pinning rollers too fast or too slow. This may be due to an uneven composition of the paste due to uneven kneading, a process effected preparatory to its being treated by the pinning machine, or may be due to expansion or contraction due to temperature.

My invention is designed to immediately regulate the motion of the pinning rollers when necessary, by means of a simple device, and to regulate the motion of the skip roller, which motion requires to be varied only when lozenges of various sizes are desired to be made, such regulation not depending upon the state or condition of the paste as in the case with the pinning portion of the machine.

In order that my invention may be clearly understood I have hereunto annexed two sheets of drawings in which—

Figure 1, is a broken side elevation of a pinning, printing, embossing and cutting machine showing my invention applied thereto. Fig. 2, is a detail view of the mechanism constituting my invention. Fig. 3, is a detail side view of the ratchet wheel for the skip-roller-shaft, instead of the groove pulley as shown in Figs. 1 and 2.

On the pinning roller driving shaft A, I employ a grooved pulley B and on the said shaft, I also mount a swing frame or lever C, free to turn about the shaft A, and carrying at its upper part a pawl D. The swing frame or lever is provided with a slot in which is arranged a screw rod E, extending the length of the slot and within the said slot is placed a slide-block F, through which passes the screw rod E. The stud F' of the block carries one end of a connecting rod G which terminates at its lower end with a clip or ring H encircling an eccentric disk I, mounted on the shaft J. To the disk I is secured in a suitable position, a guide or slide piece K, in which is adapted to freely slide, a block L, the stud M of which passes into one end of a connecting rod N, so that the latter is capable of adjustment with relation to the guide or slide-piece K. This adjustment may be more or less with relation to the axis of the shaft J, accordingly as it may be desired to give a greater or less movement to the skip roller U, and may be effected by securing the block L in a fixed position within the slot P, by means of a nut. The rod N is connected to one arm of a bell crank lever R, mounted on the skip roller shaft S, the other arm of the lever carrying a pawl T, which passes into a groove of a wheel or pulley V, keyed to the skip roller shaft. If desired instead of a grooved pulley, I may employ a toothed or ratchet wheel V' as shown in Fig. 3.

The shaft J, is rotated by a gear wheel *a*, on the main driving shaft *b*, which wheel *a*, engages a gear wheel *c*. The eccentric disk I is keyed to shaft J and consequently motion is imparted to the pinning roller drive-shaft A, by rod G, frame or lever C and pawl D. A greater or less intermittent movement may be given to the pinning roller driving shaft A, by suitably operating the screw rod E, through the medium of the hand wheel W. A gear wheel *d*, suitably driven by shaft A, is keyed on the shaft *e* and serves to impart motion to the pinning roller shafts *f, f,* in the direction indicated by the arrows, through the medium of gear wheels $g, g, g$. The traveling band $i$, feeds the paste to the pinning rollers $f$, and the paste thence passes over the inclined slab $j$, to the traveling band $k$, carried by rollers $l$, and a skip roller U keyed on the skip-roller shaft S, to which latter motion is imparted through the agency of the eccentric I, connecting rod N, lever R, pawl T and pulley or wheel V. The printing and embossing apparatus is arranged at $m$, the cutters at $n$, these parts being of ordinary construction. The pawl D, turns the pulley B, by frictional contact therewith, and this pawl, in connection with the swing frame or lever C, screw E, and rod G, constitutes an adjustable, frictional driving mechanism for varying the extent of motion of the pinning roller-shaft A, this being accomplished by merely turning the screw E, to vary the stroke of the connecting rod G. The extent of motion of the skip roller U, can also be varied by adjusting the stud M, and slide L, in the guide or slide-piece K.

Having thus described my invention, what I claim is—

1. In a lozenge or confection machine, the combination with the skip roller, and the pinning rollers, of the pinning roller driving shaft geared to the pinning rollers and provided at one extremity with an annularly grooved pulley B, a swing frame carrying a friction pawl which enters and engages, by frictional contact with the grooved periphery of the pulley, and mechanism for varying the throw of the swing frame, substantially as described.

2. In a lozenge or confection machine, the combination with the skip-roller, the pinning roller, and the pinning roller drive shaft having an attached pulley, of a swing frame carrying a pawl which engages the pulley, a connecting rod adjustable along the swing frame, an eccentric actuating the connecting rod and having a guide or slide piece, a slide adjustable on the guide or slide-piece, a connecting rod secured to the slide, a lever connected to the rod and carrying a pawl to turn the skip-roller and means for operating the eccentric, substantially as described.

WILLIAM BRIERLEY.

Witnesses:
FRANK BRIERLEY,
J. S. WHITAKER.